Patented June 9, 1925.

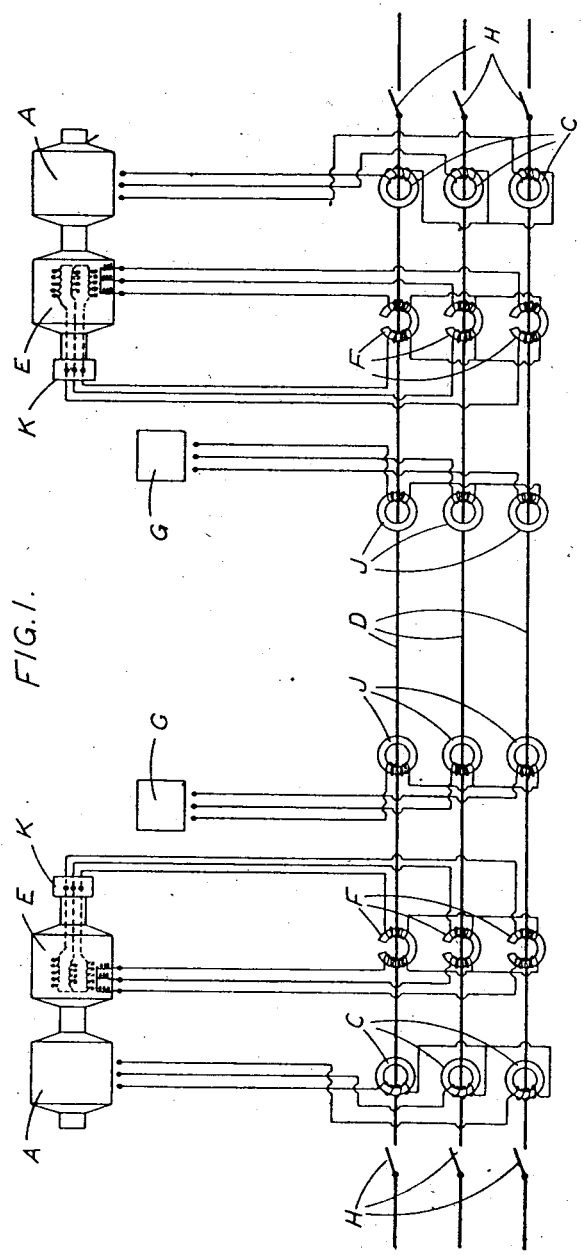

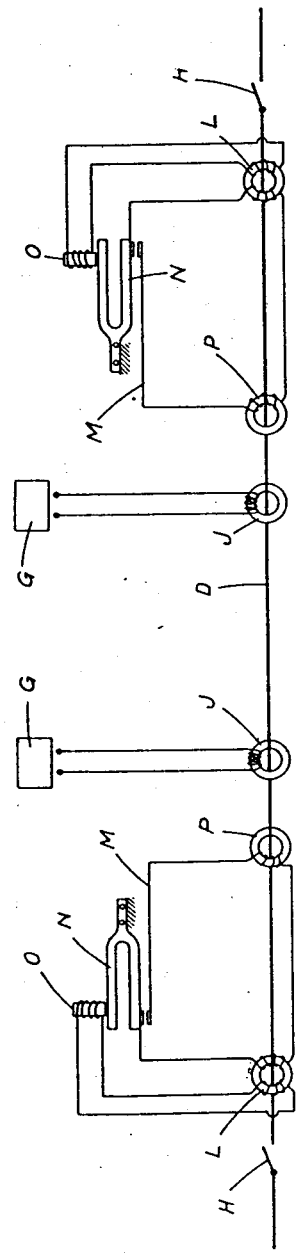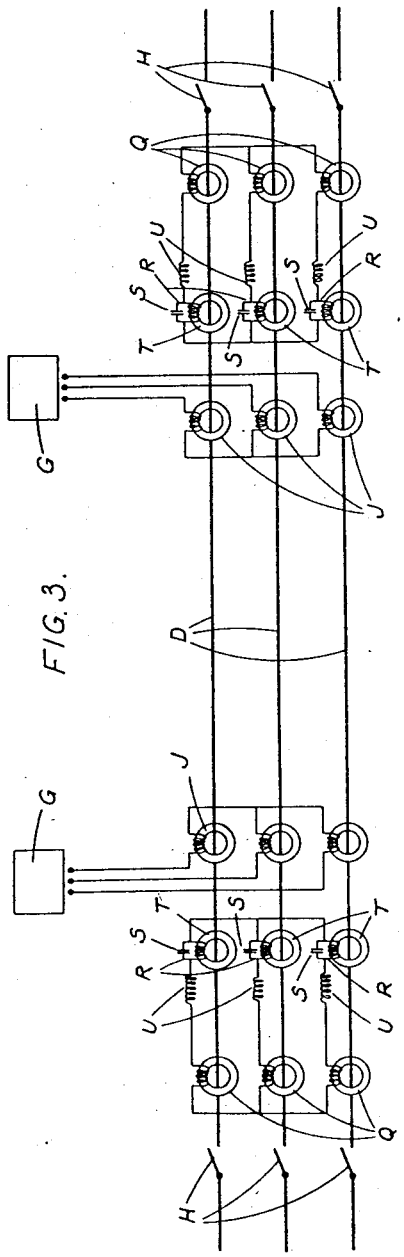

1,541,720

UNITED STATES PATENT OFFICE.

BRUCE HAMER LEESON, OF TYNEMOUTH, AND REGINALD WILLIAM BILES, OF BALCOMBE, ENGLAND, ASSIGNORS TO ELECTRICAL IMPROVEMENTS LIMITED, OF NEWCASTLE-UPON-TYNE, ENGLAND, A BRITISH COMPANY.

PROTECTIVE ARRANGEMENT FOR ALTERNATING ELECTRIC CURRENT SYSTEMS.

Application filed October 22, 1923. Serial No. 670,150.

*To all whom it may concern:*

Be it known that we, BRUCE HAMER LEESON and REGINALD WILLIAM BILES, subjects of the King of England, and residing, respectively, at Tynemouth, Northumberland, England; and Balcombe, Sussex, England, have invented certain new and useful Improvements in Protective Arrangements for Alternating Electric Current Systems, of which the following is a specification.

This invention relates to protective arrangements for alternating electric current systems and has particular reference to protective devices of the kind in which there are superimposed upon the feeders or mains of an alternating current system, opposed E. M. F.'s of a frequency different (either higher or lower) from that of the main supply the tripping devices being operated by a relay or other frequency discriminating device responsive only to the frequency of the superimposed E. M. F.'s.

In protective arrangements of this general type as hitherto proposed the power for generating the superimposed E. M. F.'s has been separate from the main supply but according to the present invention such power is derived from the main current itself and is proportional thereto. Moreover the superimposed E. M. F.'s are normally balanced, i. e., when the feeder or section is sound no current passes to the relays but on the occurrence of a fault there is an out of balance effect the resulting current of a frequency differing from the main current being proportional to the fault current.

The power for generating the superimposed E. M. F.'s may be taken from the main system by means of small transformers.

The generation of the superimposed E. M. F.'s and their application to the conductors to be protected may be accomplished in various ways of which the following are given as examples:—

(*a*) By means of rotating machinery such as a synchronous motor supplied with current from the main system through transformers such motor working in conjunction with a frequency changer.

(*b*) By means of a vibrating member such as a tuning fork arranged with contacts so as to interrupt the current from the transformer and superimpose on the system an E. M. F. of different frequency.

(*c*) By the employment of an oscillatory circuit such as a circuit comprising a capacity and inductance and a small transformer supplied with power from a transformer and arranged to superimpose high frequency oscillations on the main system, or by means of an ionic transformer.

Preferred arrangements according to these three methods are illustrated diagrammatically by way of example in the accompanying drawings, in which—

Figure 1 shows an arrangement employing a synchronous motor coupled to a frequency changer, Figure 2 an arrangement employing a tuning fork, and Figure 3 an arrangement employing an oscillatory circuit.

In Figure 1 the synchronous motor A is driven by power derived from transformers C on the main supply lines D. The motor A is coupled directly to a frequency changer E which is supplied with current at normal line frequency from transformers F and serves to superimpose on the lines D, through other windings on the same transformers F. E. M. F.'s of a frequency different from that of the line. A sensitive relay G controlling the switches H is connected to the main conductors D through transformers J and is so adjusted that it will respond only to currents at the frequency of the superimposed E. M. F.'s and to a predetermined value of such currents. K is a centrifugal contact making device mounted on the same shaft as the frequency changer E and the synchronous motor A. This device K prevents the superimposed E. M. F.'s from being applied until the prescribed frequency has been obtained. An exactly similar arrangement is provided at the other end of the section of line to be protected.

The E. M. F.'s superimposed on the line by the transformers F normally balance one another and no current flows at the superimposed frequency. When, however, a fault occurs the balance is disturbed and currents at the frequency of the superimposed E. M. F.'s flow in the main conductors D. These currents act through the transformers J on the relays G which operate the switches H to cut out the section. The employment of synchronous machinery ensures a definite frequency for the superimposed E. M. F.'s and moreover the power available to act on the relays may be made as high as may be desired by suitably dimensioning the synchronous motor. This makes it possible to employ low fault settings.

The arrangement has, however, the disadvantage of leaving the system unprotected from the moment of switching in to the time when synchronism is reached and the relays are allowed to be operative. This difficulty can be met by employing overload devices to protect the line during this period.

The arrangement shown in Figure 2 only differs from that of Figure 1 in the method of generating the superimposed E. M. F.'s and the same reference letters are employed where applicable. Transformers L similar to those usually employed with the Merz-Price protective gear are employed to supply current proportional to that in the line to a circuit M containing a tuning fork N, which is arranged to interrupt the current supplied to that circuit from the transformers L at a definite frequency corresponding to its natural frequency of vibration. The fork is maintained in a state of synchronous vibration by means of a small electro-magnetic device O energized from the transformers L. The currents at the new frequency determined by the tuning fork N act on transformers P to superimpose E. M. F.'s at this frequency on the line conductors D. As in the previous arrangement equal and opposite E. M. F.'s are superimposed on the line at the two ends of the section to be protected, and any out-of-balance effect between these E. M. F.'s resulting from a fault will act through the transformers J on the relays G to open the switches H.

This arrangement allows practically instantaneous protection to be obtained from the moment of switching in, provided that the tuning fork is made to operate more quickly than the relay mechanism.

Figure 3 illustrates a further alternative method of generating the superimposed E. M. F.'s. In this arrangement power is supplied from each line-conductor D through a small transformer Q of the Merz-Price type to an oscillatory circuit R containing a condenser S and the primary winding of a transformer T. This circuit R generates high frequency oscillations which are superimposed on the line. Thus normally balanced E. M. F.'s of high frequency are superimposed on the line, and currents at this frequency resulting from an out-of-balance effect due to a fault act, as in the previous arrangements, through transformers J on the relay G which controls the switches H. Small choke coils U are provided as shown to prevent the high frequency oscillations from reacting on the transformers Q.

This arrangement has the advantage of avoiding the use of rotating or vibrating auxiliaries, and also gives immediate protection to the line after switching in. On the other hand, accurate tuning of the oscillatory circuit is necessary to ensure that the opposed superimposed E. M. F.'s are in phase with one another.

Owing to the fact that according to this invention the superimposed currents are derived from the main current or fault current flowing in the main feeder, the superimposed current at one end of a protected section will be reversed in direction on the occurrence of, say, a fault of earth in the middle of the section. The superimposed currents will therefore assist one another and circulate through the main conductor so as to operate relays tuned to their frequency.

When several sections of a feeder are each provided with protective apparatus according to the present invention, it is convenient to arrange that a different frequency is superimposed on each section, so that only the faulty section will be cut out.

It is to be understood that in all three arrangements the devices described are duplicated one or one set at each end of the line to be protected and that the superimposed E. M. F.'s are normally balanced.

It is further to be understood that the improved arrangements can be applied say to a three-phase feeder or section in such a manner that a fault in one phase will cause the cutting out of the whole feeder or section.

What we claim as our invention and desire to secure by Letters Patent is:—

1. In a protective arrangement for an alternating electric current system the combination with the conductors of the system to be protected, of devices for generating electro-motive-forces having a frequency different from that of the main supply, means for supplying power from the main conductors to the generating devices whereby the frequency of the electro-motive-forces generated bears definite synchronous relation to that of the main supply, means whereby the electro-motive-forces generated by the generating devices are superimposed on the main conductors, circuit-breakers adapted when operated to cut out the main conductors, and means whereby the superimposed electro-motive-forces are caused to operate the circuit-breakers when a fault occurs.

2. In a protective arrangement for an alternating electric current system the combination with the conductors of the system to be protected, of a device provided at each end of the system whereby electro-motive-forces are generated having a frequency different from but bearing a definite synchronous relation to that of the main supply, transformers through which power derived from the main conductors is supplied to the generating devices, means whereby the electro-motive forces generated by the two devices are superimposed on the main conductors in such a manner as to be opposed to one another, circuit-breakers adapted when operated to cut out the main conductors, and means whereby the superimposed electro-motive-forces are caused to operate the circuit-breakers when a fault occurs.

3. In a protective arrangement for an alternating electric current system the combination with the conductors of the system to be protected, of devices for generating electric-motive-forces having a frequency different from that of the main supply, means for supplying power from the main conductors to the generating devices are superimposed on the main conductors such superimposed electro-motive-forces being normally balanced, circuit-breakers adapted when operated to cut out the main conductors, relays controlling the circuit-breakers and sensitive only to the superimposed frequency, and means whereby the out-of-balance effect of the superimposed electro-motive-forces due to the occurrence of a fault in the main conductors is operative to cause the relays to actuate the circuit-breakers and thereby to cut out the main conductors.

4. In a protective arrangement for an alternating electric current system, the combination with the conductors of the system to be protected, of a device provided at each end of the system whereby electro-motive-forces are generated having a frequency different from but bearing a definite synchronous relation to that of the main supply, transformers through which power derived from the main conductors is supplied to the generating devices, transformers through which the electro-motive-forces generated by the two devices are superimposed on the main conductors such superimposed electro-motive-forces being opposed and normally balanced, circuit-breakers adapted when operated to cut out the main conductors, relays controlling the circuit-breakers and sensitive only to the superimposed frequency, and means whereby the out-of-balance effect of the superimposed electro-motive-forces due to the occurrence of a fault in the main conductor is operative to cause the relays to actuate the circuit-breakers and thereby to cut out the main conductors.

5. In a protective arrangement for an alternating electric current system, the combination with the conductors of the system to be protected, of tuned oscillatory circuits serving to generate electro-motive-forces having a frequency different from that of the main supply, means for supplying power from the main conductors to the oscillatory circuits are superimposed on the main conductors, circuit-breakers adapted when operated to cut out the main conductors, and means whereby the superimposed electro-motive-forces are caused to operate the circuit-breakers when a fault occurs.

6. In a protective arrangement for an alternating electric current system, the combination with the conductors of the system to be protected, of a tuned oscillatory circuit provided at each end of the system whereby electro-motive-forces are generated having a frequency different from that of the main supply, transformers through which power is supplied from the main conductors to the oscillatory circuits, means whereby the electro-motive-forces generated by the oscillatory circuits are superimposed on the main conductors such superimposed electro-motive-forces being normally balanced, circuit-breakers adapted when operated to cut out the main conductors, and means whereby the out-of-balance effect of the superimposed electro-motive-forces due to the occurrence of a fault is caused to operate the circuit-breakers and thereby to cut out the main conductors.

7. A protective arrangement for an alternating electric current system including in combination at each end of the conductors of the system to be protected a tuned oscillatory circuit comprising capacities and inductances and serving to generate electro-motive-forces having a frequency different from that of the main supply, transformers through which power derived from the main current is supplied to the oscillatory circuit, transformers through which the generated electro-motive-forces are superimposed on the main conductors, a relay sensitive only to the superimposed frequency, switches in the main conductors controlled by the relay, and transformers through which the relay is connected to the main conductors, the arrangement being such that the superimposed electro-motive-forces supplied from the two ends of the system are normally balanced but on the occurrence of a fault there is an out-of-balance effect between the superimposed electro-motive-forces resulting in a current which is proportional to the main fault current and which acts on the relays to cause them to cut out the protected conductors as set forth.

In testimony whereof we have signed our names to this specification.

BRUCE HAMER LEESON.
REGINALD WILLIAM BILES.